United States Patent [19]
Lajotte et al.

[11] 4,426,730
[45] Jan. 17, 1984

[54] METHOD OF DETECTING THE PRESENCE OF SPEECH IN A TELEPHONE SIGNAL AND SPEECH DETECTOR IMPLEMENTING SAID METHOD

[75] Inventors: Dominique Lajotte, Ste Genevieve des Bois; Francis Menet, Boulogne, both of France

[73] Assignee: Societe Anonyme dite: Compagnie Industrielle des Telecommunications Cit-Alcatel, Paris, France

[21] Appl. No.: 278,236

[22] Filed: Jun. 29, 1981

[30] Foreign Application Priority Data

Jun. 27, 1980 [FR] France ................................ 80 14400

[51] Int. Cl.$^3$ ............................................. G10L 1/00
[52] U.S. Cl. ....................................... 381/46; 364/513
[58] Field of Search ............ 179/1 SC, 1 VC; 370/81; 364/513; 381/46

[56] References Cited

U.S. PATENT DOCUMENTS

4,027,102  5/1977  Ando et al. ........................ 179/1 SC
4,061,878 12/1977  Adoul et al. ...................... 179/1 SC

FOREIGN PATENT DOCUMENTS

1244664 12/1958  France .
2158720  6/1973  France .
2266991 10/1975  France .

*Primary Examiner*—Emanuel S. Kemeny
*Attorney, Agent, or Firm*—Sughrue, Mion, Zinn, Macpeak & Seas

[57] ABSTRACT

In a method of detecting the presence of speech in a telephone signal, a signal sequence is interpreted as constituting speech if its mean power level exceeds a threshold, the value of which is decreased as the number of passages through zero level in the sequence approaches 1.25 per millisecond (0.25 Hz). A speech detector implementing this method receives pulse code modulated signal samples on its input. It comprises a squaring circuit driving a digital accumulator whose output signal is proportional to the mean power level of each of consecutive 4 millisecond signal sequences. A change of sign detector and a second digital accumulator indicate the number of passages through zero level in each of these sequences. Banks of threshold comparators and a selector circuit are used to choose between the various threshold values. The selected value is lowest when the number of passages through zero level is between 5 and 6 per millisecond.

9 Claims, 5 Drawing Figures

METHOD OF DETECTING THE PRESENCE OF SPEECH IN A TELEPHONE SIGNAL AND SPEECH DETECTOR IMPLEMENTING SAID METHOD

BACKGROUND OF THE INVENTION

1. Field of the Invention

The present invention concerns the transmission of speech signals.

2. Description of the Prior Art

Detecting the presence of speech has numerous applications, especially in telephony, in relation to concentrators. It is well known that only 30 to 40% of the duration of a telephone conversation is devoted to speech and that one means of increasing the capacity of a multichannel transmission system consists in using these periods of silence on existing channels to create additional channels.

A known method of detecting the presence or absence of speech on a channel is based on the use of a power level criterion according to which any signal which, during an elementary time interval, has a mean power level higher than a predetermined threshold above the mean noise level is considered as constituting a speech signal, the remainder constituting silence. Unfortunately defining this threshold involves a compromise between two mutually conflicting requirements: the threshold must be as high as possible for good speech/silence discrimination and as low as possible to prevent "chopping" of the speech signal, reducing its intelligibility. One known method of effecting this compromise is to modify the power level threshold according to the mean power level for the person speaking, evaluated over a relatively long period, and to systematically extend sequences detected as constituting speech by a "holding interval" the duration of which is inversely proportional to the mean power level for the person speaking.

A major disadvantage of this power criterion is that it is not possible to reduce the power level threshold sufficiently to provide for detecting non-voiced beginnings of words corresponding to fricative and sibilant consonants without seriously compromising the effectiveness of the detector. The result is a certain degradation in message intelligibility. An example concerns the word "seven" which is often transmitted as "even".

Another known method of detecting the presence or absence of speech on a channel is based on criteria associated with passages of the signal through zero level. In the case of a speech signal these passages through zero level contain a high proportion of the information content since the intelligibility of speech signals is only slightly degraded by peak limiting. These "zero crossing" criteria are concerned with the frequency characteristics of the analysed signal sequence, rather than its power level. They consist in assuming that the sequence analysed constitutes speech if the distribution of zero crossings is indicative of a frequency component with maximum amplitude in the top or bottom part of the speechband, as most speech signals show a power spectrum with a peak which is off-center relative to the speech band, towards the lower end for the vowels and certain semi-vowel, nasal and plosive consonants and towards the upper end for fricative and sibilant consonants. The disadvantage of these zero crossing criteria is that their effectiveness is largely dependent on the statistical and frequency distribution properties of the noise content of the signal being analysed.

It is known to compensate for the insensitivity of the power level criterion to non-voiced fricative and sibilant consonants by associating this criteria with a zero crossing criterion, more precisely by lowering the threshold when the zero crossing criterion shows that the peak in the power spectrum of the signal being analysed is near the top end of the speech band. An example of such a speech detector is described in French Patent Specification No 2 158 720. The criterion used in this detector is the exceeding of a value of 16 by the algebraic sum of two marks attributed to consecutive samples of the signal being analysed taken at intervals of 125 microseconds. One of these marks has an integer value between $-1$ and $+2$, according to the absolute amplitude of the signal sample, and represents, after summation, the rms value or power level of the signal. The other mark has the value 1 if the sample has an absolute value higher than a predetermined threshold and if it and the two preceding samples are of alternate sign. Otherwise its value is 0. The value of this mark integrated over a number of consecutive signal samples is, in view of the sampling rate, indicative of the proportion of frequencies at the upper end of the speech band in the signal being analysed.

The object of the present invention is to provide a method of detecting the presence of speech in a telephone signal and a speech detector implementing that method based on the use of a power level criterion in conjunction with a zero crossing criterion and of increased effectiveness.

SUMMARY OF THE INVENTION

The invention consists in a method of detecting the presence of speech in a telephone signal whereby any signal sequence having a mean power level exceeding a threshold whose value is decreased as the number of passages through zero level in said sequence approaches 1.25 per millisecond is interpreted as constituting speech.

The signal to be analysed is advantageously divided into consecutive sequences 4 milliseconds in duration.

In accordance with one embodiment of the invention the aforementioned threshold has three discrete values: the lowest value corresponds to between 1 and 1.5 passages through zero level per millisecond; the intermediate value corresponds to between 0 and 1 or between 1.5 and 2.5 passages through zero level per millisecond; the highest value corresponds to more than 2.5 passages through zero level per millisecond.

When, in accordance with the aforementioned criterion, the presence of speech has been detected in a number of consecutive signal sequences with a cumulative duration at least equal to a predetermined "previous activity interval", subsequent signal sequences are interpreted as constituting speech for a predetermined "holding interval".

The lowest value of the aforementioned threshold may be disabled and the intermediate value extended so as to correspond to up to 2.5 passages through zero level per millisecond when the signal sequence currently being analysed was preceded by a sequence for which the mean power level exceeded a predetermined "loud speech" level much higher than the aforementioned discrete threshold values without the mean power levels of a number of consecutive sequences being lower than a predetermined "quiet speech" level between said lower and intermediate threshold values. In this case it may be advantageous to increase the number of consecutive sequences to be interpreted as constituting speech for a holding interval, and to decrease the duration of this holding interval.

The invention further consists in a speech detector receiving on an input at regular intervals digital samples including a sign bit of the signal to be analysed, the speech detector comprising:

a squaring circuit which is connected to said speech detector input;

a first digital accumulator which is connected to the output of said squaring circuit and which is reset to zero every L signal samples (where L is a positive integer);

a circuit for detecting variations in the value of the sign bit of signal samples applied to said speech detector input;

a second digital accumulator which is connected to the output of said sign bit value variation detection circuit and which is reset to zero every L signal samples;

a bank of first threshold comparators with staggered threshold values and having respective inputs connected to the output of said first digital accumulator and respective outputs carrying respective binary signals indicating whether the output of said first digital accumulator is above or below their respective thresholds;

a bank of second threshold comparators with staggered threshold values defining contiguous ranges of which one encompasses the value $1.25 \times L \times \tau$ where $\tau$ is expressed in milliseconds, said second threshold comparators having respective inputs connected to the output of said second digital accumulator and respective outputs carrying respective binary signals representative of the range currently encompassing the output signal of said second digital accumulator; and a selector circuit having inputs connected to the outputs of said first and second threshold comparators and being responsive to the output states of said second threshold comparators by selecting the output of one of said first threshold comparators so that the threshold value of the selected first threshold comparator decreases with increasing separation of the range encompassing the output signal of said second digital accumulator from the range encompassing the value $1.25 \times L \times \tau$, that output state of the selected first threshold comparator which corresponds to an output signal from said first digital accumulator exceeding this threshold value being indicative of the presence of speech and the complementary output state being indicative of the absence of speech.

A speech detector in accordance with the invention may advantageously further comprise:

a time-delay generator connected to the output of said selector circuit and enabled for a period equal to said holding interval in response to the output signal of said selector circuit going to the condition indicative of the absence of speech after remaining for a period at least equal to said previous activity interval in the condition indicative of the presence of speech; and a holding circuit controlled by said time-delay generator which is connected to the output of said selector circuit and the output signal of which constitutes the speech detector output signal, the state of which signifies the presence of speech or is equivalent to the output state of said selector circuit, according to whether said time-delay generator is enabled or not.

In accordance with one embodiment of the invention, the speech detector further comprises:

a bank of two third threshold comparators, one of which has a threshold value much higher than those of said first threshold comparators and the other of which has a threshold value between the lowest first threshold comparator threshold value and the next higher first threshold comparator threshold value;

a bistable circuit which is connected to the outputs of said third threshold comparators and which is switched to a state indicative of a predetermined loud speech level under the control of said third threshold comparator with the higher threshold value and to a complementary state indicative of a predetermined quiet speech level under the control of the other of said third threshold comparators; and a disabling circuit in said selector circuit responsive to said bistable circuit state indicative of said loud speech level by preventing selection of the first threshold comparator with the lowest threshold value.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
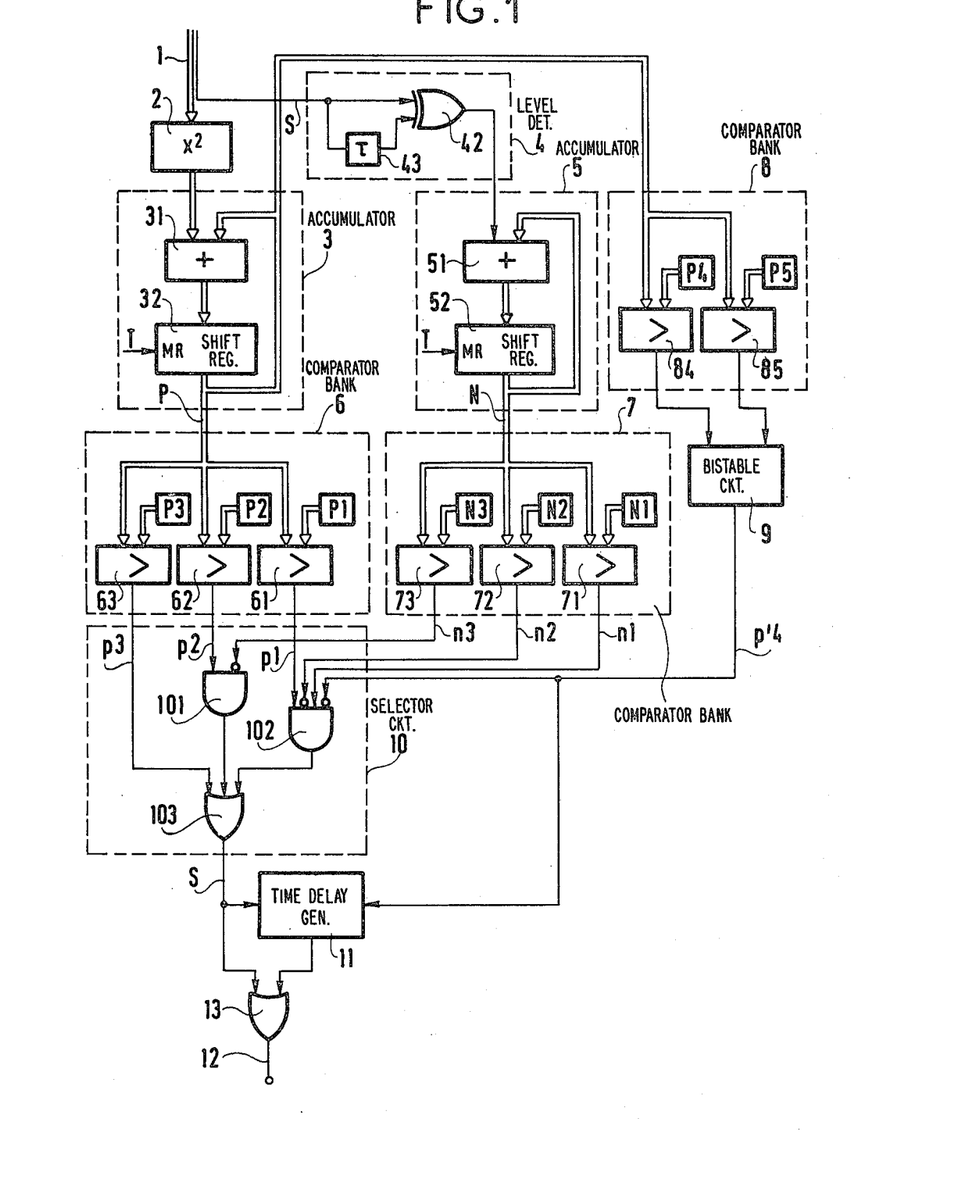
FIG. 1 is a general block schematic of a speech detector in accordance with the invention.

The speech detector shown in FIG. 1 is intended for analysing a speech signal transmitted by pulse code modulation (PCM) in the form of x (n$\tau$) digitised samples spaced at intervals $\tau$ of 125 microseconds. The samples are encoded using a compressed eight-bit code comprising seven absolute value bits and a sign bit. It is assumed that these bits are available in parallel configuration.

The seven absolute value bits of the digitised samples x (n$\tau$) of the speech signal applied to input 1 of the detector are directed to a squaring circuit 2, which may be implemented using a programmable read only memory (PROM), for example, and thence into a first digital accumulator 3 which accumulates the absolute values $x^2$ (n$\tau$) of the digitised samples thirty-two times. As shown in the schematic, the first digital accumulator 3 may be implemented by means of a digital adder 31 connected to a shift register 32 with parallel inputs and outputs looped back on itself through one input of digital adder 31, this register being reset to zero every 32 samples, that is to say at an interval T of 4 milliseconds. Its accumulated output signal P represents the mean power level of the speech signal during the preceding 4 milliseconds.

The sign bit S (x (n$\tau$)) of the digitised samples x (n$\tau$) of the speech signal applied to input 1 of the detector is directed to a change of level detector circuit 4 which may be implemented, for example, by means of an exclusive-OR gate 42 with two inputs, one receiving the sign bit directly and the other receiving the sign bit through a time-delay circuit 43 introducing a time-delay $\tau$ corresponding to the time interval between consecutive signal samples. The output signal of the change of level circuit 4 is representative of passages through zero level of the speech signal applied to input 1 of the speech detector. This signal is applied to the input of a second digital accumulator 5 where it is accumulated over a period T corresponding to thirty-two digitised samples of the speech signal. The second digital accumulator 5 may be of the same construction as the first, that is to say consisting of a digital adder 51 connected to a shift register 52 with parallel inputs and outputs looped back on itself through one input of the adder, this register being reset to zero at intervals T of 4 milliseconds. Its accumulated output signal N represents the number of passages of the speech signal through zero level during the preceding 4 milliseconds.

Signal P representing the mean speech signal power level from the output of the first digital accumulator 3 is applied to the input of a bank 6 of three first digital comparators 61, 62 and 63 which compare it with three staggered threshold values P1, P2 and P3 (P1<P2<P3) with respective binary output signals p1, p2 and p3. Each of these signals is at state 1 if signal P exceeds the respective threshold P1, P2 or P3. Otherwise it is at state 0.

Threshold P3 is chosen as −40 dBm0 and corresponds to the maximum tolerable noise level for an international circuit telephone channel. Threshold P2 is chosen as −43 dBm0 and threshold P1 as −56 dBm0.

Signal N representing the number of passages through zero level of the speech signal in 4 milliseconds from the output of the second digital accumulator 5 is applied to the input of a bank 7 of three second digital comparators 71, 72 and 73 which compare it with three staggered threshold values N1, N2 and N3 and which have respective binary output signals n1, n2 and n3 each of which is at state 1 when signal N exceeds the corresponding threshold N1, N2 or N3 and is otherwise at state 0.

Threshold N3 is chosen as 10, corresponding to 2.5 passages through zero per millisecond or a fundamental frequency of 1 250 Hz. Threshold N2 is chosen as 6, corresponding to 1.5 passages through zero level per millisecond or a fundamental frequency of 750 Hz. Threshold N1 is chosen as 4, corresponding to 1 passage through zero level per millisecond or a fundamental frequency of 500 Hz.

Signal P representing the speech signal mean power level is also applied to the input of a bank 8 of two third comparators 84 and 85 which compare it with a very high threshold value P4 corresponding to a predetermined "loud speech" level (−14 dBm0, for example), selected according to the fact that the mean power level on a telephone channel is −15 dBm0, and with a threshold value P5 between threshold values P1 and P2 of respective first comparators 61 and 62 (−47 dBm0, for example). Each of third comparators 84 and 85 has a respective binary output signal at state 1 if signal P exceeds its threshold and at state 0 otherwise.

Third comparators 84 and 85 are connected to a bistable circuit 9 with a binary output signal p′4 which goes to state 1, corresponding to the loud speech level, as soon as signal P representing the speech signal mean power level exceeds the highest threshold value P4. It returns to state 0, corresponding to a predetermined "quiet speech" level, if signal P remains below threshold P5 for a period of 32 milliseconds (8×T).

Figures 2, 3:
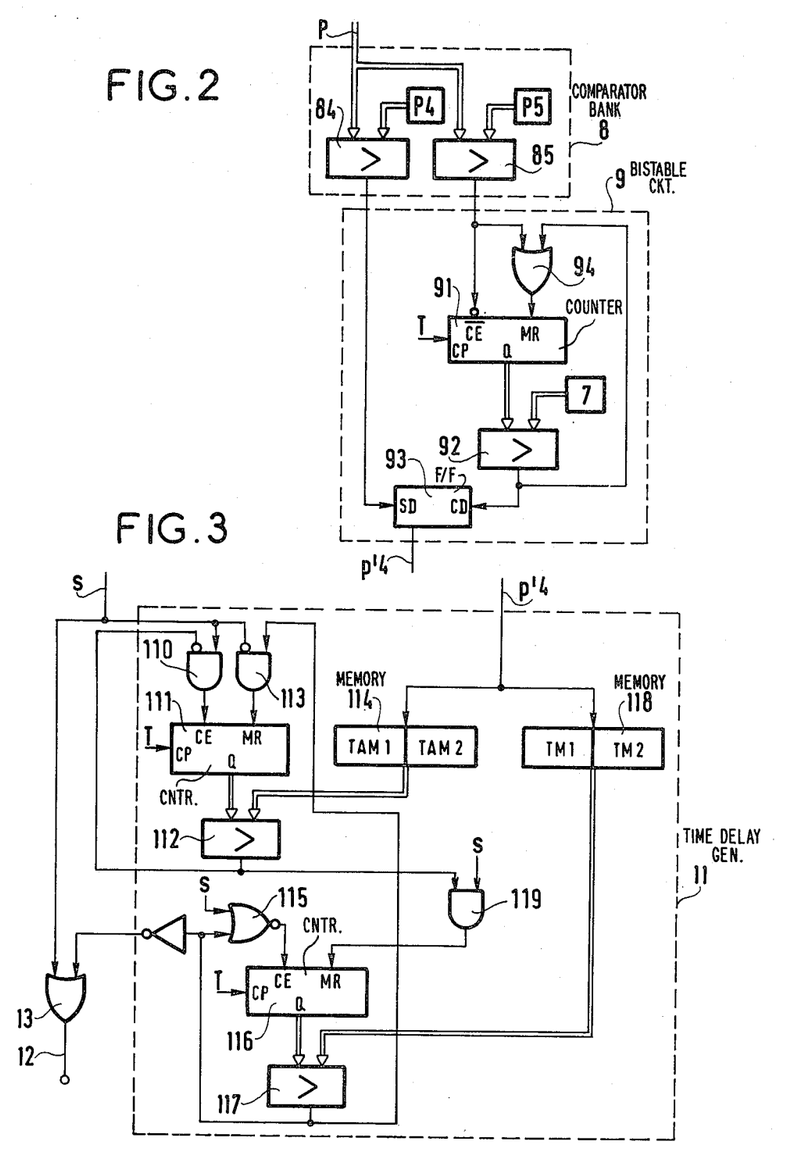
FIG. 2 is a block schematic of a bistable circuit used in the speech detector shown in FIG. 1.
FIG. 3 is a block schematic of a time-delay generator used in the speech detector shown in FIG. 1.

As shown in FIG. 2, bistable circuit 9 may comprise a counter 91 feeding a comparator 92, the threshold value for which is 7, and a bistable 93. Counter 91 has a clock input CP connected to receive a squarewave signal of period T, a complemented count enable input $\overline{CE}$ connected to the output of the third comparator 85 with threshold P5, a reset input MR connected to the output of an OR gate 94 with two inputs, one connected to the output of the third comparator 85 with threshold value P5 and the other connected to the output of comparator 92, and a multiple-digit parallel output Q. Comparator 92 has two parallel inputs, one connected to output Q of counter 91 and the other to a register containing the digit 7 in binary coded form. Bistable 93 has a "reset to 1" input SD connected to the output of the third comparator 84 having the threshold value P4 and a "reset to 0" input CD connected to the output of comparator 92.

A signal P with level exceeding threshold P4 causes the output of third comparator 84 to go to state 1, as a result of which output p′4 of bistable 93 also goes to state 1. It also causes the output of the third comparator 85 to go to state 1, which locks counter 91 in state 0. A signal P with level below threshold P5 causes the output of the third comparator 85 to go to state 0 which releases counter 91. If signal P has a level below threshold P5 for less than 32 milliseconds (8×T) output Q of counter 91 exceeds the threshold (7) of comparator 92, the output of which goes to state 1 which causes output p′4 of bistable 93 to go to state 0 and resets to 0 counter 91.

Returning to FIG. 1, the outputs of first and second comparators 61, 62, 63, 71, 72 and 73 and output p′4 of bistable 9 are connected to the inputs of a selector circuit 10 with a single output carrying a binary signal s which is at state 1 to indicate the presence of speech and at state 0 to indicate the absence of speech. In terms of the inputs to selector circuit 10, output signal s is defined by the logic equation:

$$s = p3 + p2\cdot\overline{n3} + p1\cdot\overline{p'4}\cdot\overline{n1}\cdot\overline{n2} \tag{1}$$

Figure 4A:
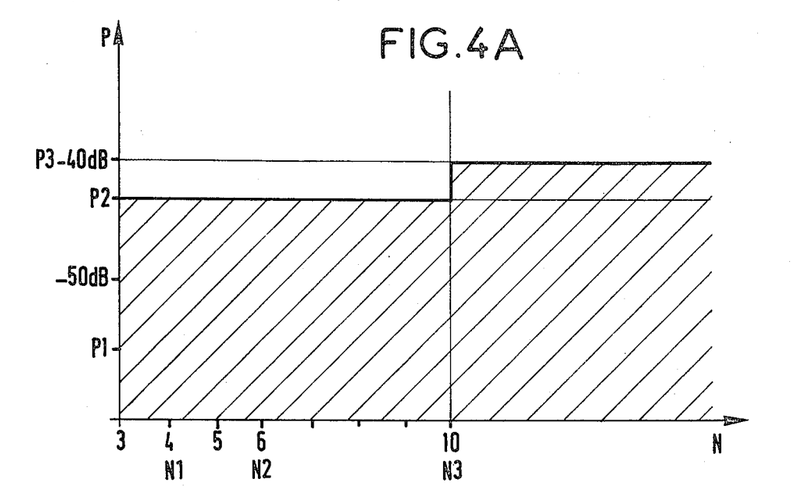
FIGS. 4A and 4B are state diagrams illustrating the criterion used to distinguish between speech and noise by the speech detector shown in FIG. 1.
Figure 4B:
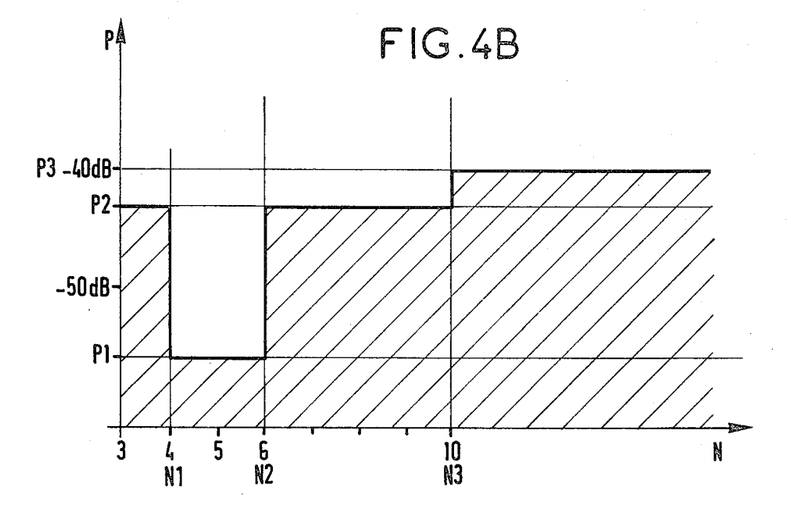

The resulting dependence of the logic state of output signal s from selector circuit 10 on the mean power level P and the number of passages through zero level of the speech signal defines the speech detection criterion used. This dependent relationship is shown more clearly in FIGS. 4A and 4B which are state diagrams showing, in accordance with equation (1), the logic state of signal s according to the mean power level P and the number N of passages through zero in a 4 millisecond sequence of the speech signal. FIG. 4A represents the situation in which signal p′4 is at state 1, corresponding to a loud speech level. FIG. 4B shows the situation in which signal p′4 is at state 0, corresponding to a quiet speech level. The shaded areas in FIGS. 4A and 4B are those for which signal s is at state 0, indicating detection of the absence of speech. The non-shaded areas are those for which this signal s is at state 1, indicating detection of the presence of speech. As shown by FIGS. 4A and 4B, selector circuit 10 selects the output of one of the first comparators 61, 62 and 63 according to the number N of passages through zero level, the selected first comparator 61, 62 or 63 being of increasingly lower threshold as the number N of passages through zero level approaches five in every 4 millisecond sequence (that is to say, 1.25 passages through zero level per millisecond), and the facility for selecting the first comparator 61 with the lowest threshold is disabled in the presence of the high speech level.

Referring again to FIG. 1, selector circuit 10 may comprise:

an AND gate 101 with two inputs, one complemented and connected to the output of second comparator 73 with threshold N3 and the other, not complemented, connected to the output of first comparator 62 with threshold P2, an AND gate 102 with four inputs, two of which are complemented and connected respectively to the output of second comparator 72 with threshold N2 and the output of bistable 9, the other two of which are not complemented and are connected respectively to the output of first comparator 61 with threshold P1 and the output of second comparator 71 with threshold N1, and an OR gate 103 with three inputs, the first of which is connected to the output of first comparator 63 with threshold P3, the second of which is connected to the output of AND gate 101 and the third of which is connected to the output of AND gate 102.

The output of selector circuit 10 is connected to a time-delay generator 11 which is enabled for a "holding interval" TM as soon as output signal s from selector circuit 10 goes to state 0, corresponding to detection of absence of speech, after remaining for at least a "previous activity interval" in state 1 corresponding to detection of the presence of speech. The previous activity interval TAM and the holding interval TM may each take one of two respective values TAM1 or TAM2 and TM1 or TM2, selected according to the state of output signal p'4 of bistable circuit 9. In the presence of a loud speech level with the output of bistable circuit 9 at state 1 the previous activity interval is TAM1=24 milliseconds ($6 \times T$) and the holding interval is TM1=80 milliseconds ($20 \times T$). In the presence of a quiet speech level with the output of bistable circuit 9 at state 0 the previous activity interval is TAM2 =8 milliseconds ($2 \times T$) and the holding interval is TM2=256 milliseconds ($64 \times T$).

As shown in FIG. 3, time-delay generator 11 may comprise a first subsystem including a counter 111 connected to a comparator 112 with two first threshold values and a two-location memory 114 for storing said first threshold values, and a second subsystem including a counter 116 connected to a comparator 117 with two second threshold values and a two-location memory 118 for storing the two second threshold values.

Counter 111 has a clock input CP connected to receive a squarewave signal of period T, a count enable input CE connected to the output of an AND gate 110 having a complemented input connected to the output of comparator 112 and a non-complemented input connected to the output of selector circuit 10, a "reset to 0" input MR connected to the output of an AND gate 113 with a complemented input connected to the output of selector circuit 10 and a non-complemented input connected to the output of comparator 117, and a parallel output Q.

Comparator 112 has two parallel inputs, one connected to output Q of counter 111 and the other connected to the output of the two-location memory 114, addressing of which is controlled by output signal p'4 of bistable circuit 9 and which stores in binary form the digit 5 corresponding to TAM1 less one time interval T and the digit 1 corresponding to TAM2 less one time interval T. The output of comparator 112 is, like that of the previously-mentioned comparators, at state 1 when its threshold is exceeded and at state 0 otherwise. A state 1 at the output of selector circuit 10 is indicative of the presence of speech in the analysed signal sequence and enables counting by counter 111, provided that the content of the latter does not exceed the threshold of comparator 112. If state 1 is maintained at the output of selector circuit 10 for a number of consecutive time intervals T sufficient for the content of counter 111 to exceed the threshold of comparator 112, the output of this comparator goes to state 1 which disables counter 111. A state 0 at the output of selector circuit 10 disables counter 111 and under certain conditions, to be described in detail later, resets it to 0.

Counter 116 has a clock input CP connected to receive a squarewave signal of period T, a count enable input CE connected to the output of a NOR gate 115 with two inputs, one connected to the output of selector circuit 10 and the other connected to the output of comparator 117, a "reset to 0" input MR connected to the output of an AND gate 119 with two inputs, one of which is connected to the output of selector circuit 10 and the other of which is connected to the output of comparator 112, and a parallel output Q.

Comparator 117 has two parallel inputs, one connected to output Q of counter 116 and the other connected to the output of the two-location memory 118, addressing of which is controlled by output signal p'4 of bistable circuit 9 and which stores in binary form the digit 19 corresponding to TM1 less one time interval T and the digit 63 corresponding to TM2 less one time interval T. The output of comparator 117 is, like that of the previously-mentioned comparators, at state 1 when its threshold is exceeded and at state 0 otherwise. It is connected to the input of an inverter (no reference number on diagram) the output of which constitutes the output of time-delay generator 11.

State 0 at the output of selector circuit 10 is indicative of the absence of speech in the signal sequence analysed and enables counting by counter 116 provided that the content of the latter does not exceed the threshold of comparator 117. If state 0 is maintained at the output of selector circuit 10 for a number of time intervals T sufficient for the content of counter 116 to exceed the threshold of comparator 117, the output of this comparator goes to state 1 and disables counter 116. State 1 at the output of selector circuit 10 disables counter 116 and resets counter 116 to zero if and only if the output of comparator 112 is at state 1.

It should be noted that state 0 at the output of selector circuit 10 does not reset counter 111 to zero unless the output of comparator 117 is at state 1, that is to say if state 0 is maintained at the output of selector circuit 10 for an interval at least equal to the holding interval TM. This will be further explained later.

As counter 111 is initially at zero and counter 116 is locked on a value exceeding the threshold of comparator 117, a state 1 at the output of selector circuit 10 enables counting by counter 111 and maintains counter 116 disabled.

If state 1 is maintained at the output of selector circuit 10 for a number of time intervals T sufficient for the content of counter 111 to attain a value equal to the threshold of comparator 112 increased by unity, counter 111 locks on this value. The output of comparator 112 goes to state 1 which resets counter 116 to zero.

This counter then remains at zero for as long as state 1 is maintained at the output of selector circuit 10. When this is no longer the case, and thus following a continuous period in which the presence of speech is detected of duration exceeding or equal to the previous activity time TAM, counter 116 begins to count (that is to say time-delay generator 11, the output of which was initially at state 0 and went to state 1 when counter 116 was reset to zero, is enabled) while counter 111 remains disabled. If state 0 is then maintained at the output of selector circuit 10 for a number of consecutive time intervals T sufficient for the content of counter 116 to attain a value equal to the threshold of comparator increased by unity, counter 116 locks on that value (that is to say time-delay generator 11 is no longer enabled). The output of the generator returns to state 0 and counter 111 is reset to zero, in which state it remains locked and the configuration is as initially. If state 1 appears at the output of selector circuit 10 when the content of counter 116 does not exceed the threshold of comparator 117 (that is to say if absence of speech has been detected for a period shorter than the holding interval TM), counter 116 is reset to zero, in which state it remains locked, so that time-delay generator 11 is no longer enabled, the output of the generator remains at state 1 and counter 111 remains locked on the value equal to the threshold of comparator 112 increased by unity. Reappearance of state 0 at the output of selector circuit 10, irrespective of the duration for which state 1 has been maintained at this output (that is to say the period for which presence of speech has been detected) again enables counting by counter 116, which restarts counting from zero. This re-enables time-delay generator 11, the output of which remains at state 1. Counter 111 remains disabled.

If state 1 disappears from the output of selector circuit 10 while the content of counter 111 does not exceed the threshold of comparator 112 (that is to say if presence of speech has been detected for a period shorter than the previous activity interval TAM), counter 111 is reset to zero whereas counter 116 remains disabled, thus reverting to the initial state. Time-delay generator 11 is not enabled and its output, initially at state 0, remains in this state.

It should be noted that when time-delay generator 11 is enabled, that is to say when counter 116 is counting, the output of the time-delay generator is always at state 1. When time-delay generator 11 is not enabled (that is to say when counter 116 is disabled) its output is either at state 0 (counter 116 locked on a value equal to the threshold of comparator 117 increased by unity) or at state 1 (counter 116 locked on zero). It is only possible for time-delay generator 11 to be disabled with its output at state 1 when the output of selector circuit 10 is itself at state 1.

Note that with this embodiment of time-delay generator 11 when the output of selector circuit 10 goes from state 0 to state 1 while counter 116 is counting the current counting cycle is interrupted (that is to say enabling of time-delay generator 11 is prevented). When the output of selector circuit 10 subsequently reverts to state 0 counter 116 restarts from zero to execute a new counting cycle. In other words, time-delay generator 11 is re-enabled for the duration of the holding interval TM, irrespective of the period for which the output of the selector circuit has remained at state 1. As an alternative, counter 116 could restart from 0 for a new counting cycle only if the output of the selector circuit has remained at state 1 for a period at least equal to the previous activity interval TAM, resuming the interrupted counting cycle otherwise. To achieve this modification it would be sufficient to connect the "reset to 0" input MR of counter 111 to the output of selector circuit 10 through an inverter, AND gate 113 no longer being required.

Returning to FIG. 1, the output 12 of the speech detector is connected to the output of selector circuit 10 through an OR gate 13 constituting a holding circuit controlled by time-delay generator 11. Gate 13 has two inputs, one connected to the output of selector circuit 10 and the other to the output of time-delay generator 11. This gate provides for switching the speech detector output to state 1 to indicate the presence of speech as soon as the output of selector circuit 10 goes to state 1, indicating the presence of speech in the analysed 4 millisecond sequence, or as soon as the output of time-delay generator 11 goes to state 1 indicating, when the output of selector circuit 10 is not at state 1, that the time-delay generator is enabled.

The speech detector whose design has just been described analyses the signal in consecutive 4 millisecond sequences for each of which it determines the mean power level and the number of passages through zero level, for comparison of these parameters with threshold values in order to deduce whether the signal represents speech or noise.

In the event that the mean power levels of signal sequences analysed previously have not exceeded the $-14$ dBm0 threshold P4 and where at least eight consecutive sequences have been below the $-47$ dBm0 threshold P5, that is to say in the presence of a quiet speech level, a 4 millisecond sequence is considered to indicate the presence of speech if one of the following conditions is met:

its mean power level exceeds the $-40$ dBm0 threshold P3, its mean power level is between the $-40$ dBm0 threshold P3 and the $-43$ dBm0 threshold P2 for a number of passages through zero level less than 10, its mean power level is between the $-43$ dBm0 threshold P2 and the $-56$ dBm0 threshold P1 for a number of passages through zero level of 5 or 6.

If two consecutive 4 millisecond sequences are indicative of the presence of speech (previous activity interval TAM2), the following 64 sequences (holding interval TM2) are forcibly interpreted as indicative of the presence of speech, whether or not this would otherwise be the case. In the event that the mean power levels of signal sequences analysed previously have exceeded the $-14$ dBm0 threshold P4 at least once without eight consecutive sequences subsequently being below the $-47$ dBm0 threshold P5, that is to say in the presence of a loud speech level, a 4 millisecond sequence is considered as indicative of the presence of speech if one of the following conditions is met:

its mean power level exceeds the $-40$ dBm0 threshold P3, its mean power level is between the $-40$ dBm0 threshold P3 and the $-43$ dBm0 threshold P2 for a number of passages through zero level less than 10.

If six consecutive 4 millisecond sequences are indicative of the presence of speech (previous activity interval TAM1) the following 20 sequences (holding interval TM1) are forcibly interpreted as indicative of the presence of speech, whether or not this would otherwise be the case.

The method used to differentiate between the presence and absence of speech in the previously described speech detector consists in regarding as speech any sequence of the signal analysed having a mean power level exceeding a threshold whose value is decreased as the number of passages through zero level in the sequence approaches 1.25 per millisecond. Reducing the power level threshold in order to distinguish between speech and noise as the number of passages through zero level approaches 1.25 per millisecond (that is to say as the frequency of the fundamental component of the signal analysed approaches 625 Hz) would not provide for detecting fricative or sibilant consonants according to the commonly accepted theory whereby they comprise only high frequency components between 1.5 and 4 kHz, so that the number of passages through zero level is between 3 and 8 per millisecond. This has been found not to be the case in practice, however, and the method disclosed has been found to be particularly effective.

This would seem to be explained by the fact that previous studies of fricative and sibilant consonants have been based on the hypothesis that the corresponding accoustic signal may be regarded as similar to an ergodic and stationary random process, which is only true if the analysed signal sequence is correctly chosen and has a certain level. An analysis of low-level phonemes formed by fricative and sibilant constants shows that there are residual low-frequency components in the 550-750 Hz band. The stationary condition hypothesis is not justified for a phoneme duration which is of the order of 250 milliseconds, the ratios between the components at the various frequencies varying within a sequence according to its position within the phoneme. There is a very high probability that the low-frequency components in the 550-750 Hz band will be preponderant in a sequence of approximately 10 milliseconds at the start of a phoneme. Detecting this sequence by virtue of the number of passages through zero level in conjunction with a holding interval with a duration of the same order of magnitude as that of the phoneme (250 ms) then provides for detecting the major part of the phoneme. The benefit of using only the components in the 550-750 Hz band for adjusting the power threshold to differentiate between the presence and absence of speech, to the exclusion of high-frequency components, results from the fact that it is in the 550-750 Hz band containing the peak in the power spectrum for a speech signal taken over a relatively long period that the best signal-to-noise ratio is found.

It will be understood that various changes in the details, materials and arrangements of parts, which have been herein described and illustrated in order to explain the nature of the invention, may be made by those skilled in the art within the principle and scope of the invention as expressed in the appended claims.

It is claimed:

1. A method for detecting the presence of speech in a telephone signal comprising the steps of:
   setting a threshold having a value which decreases as the number of passages through zero level of said signal approaches 1.25 per millisecond; and
   interpreting as constituting speech any signal sequence having a mean power level exceeding said threshold.

2. The method according to claim 1, further comprising the step of dividing said telephone signal into consecutive sequences four milliseconds in duration; and wherein said step of setting said threshold comprises setting said threshold to one of three discrete values, a lowest one of said three discrete values corresponding to five or six passages through said zero level in each said sequence, an intermediate one of said three discrete values corresponding to up to four or between seven and ten passages through said zero level in each said sequence, and a highest one of said three discrete values corresponding to more than 10 passages through said zero level in each said sequence.

3. The method according to claim 1, wherein said step of setting said threshold comprises setting said threshold to one of three discrete values, a lowest one of said three discrete values corresponding to between 1 and 1.5 passages through said zero level per millisecond, an intermediate one of said three discrete values corresponding to less than 1 or between 1.5 and 2.5 passages through said zero level per millisecond, and a highest one of said three discrete values corresponding to more than 2.5 passages through said zero level per millisecond.

4. The method according to claim 3, further comprising the step of eliminating said lowest one of said three discrete values and extending said intermediate value so as to correspond to between 1 and 2.5 passages through said zero level per millisecond when a signal sequence currently being analyzed is preceeded by a sequence for which a main power level exceeds a predetermined loud speech level much higher than 2.5 passages through said zero level per millisecond without main power levels of a predetermined number of consecutive sequences being lower than a predetermined quiet speech level between said lower and intermediate threshold values.

5. The method according to claim 4, further comprising the step of interpreting signal sequences as constituting speech for a predetermined holding interval when the presence of speech has been detected in a predetermined number of consecutive signal sequences with a cumulative duration at least equal to a predetermined previous activity interval, said previous activity and holding intervals each having a higher and a lower value, and further comprising the step of maintaining said previous activity interval at its lower value and said holding interval at its higher value except when said lowest threshold value is disabled, and then maintaining said previous activity interval at its higher value and said holding interval at its lower value.

6. A speech detector implementing a method of detecting the presence of speech in a telephone signal whereby any signal sequence having a mean power level exceeding a threshold whose value is decreased as the number of passages through zero level in said sequence approaches 1.25 per millisecond is interpreted as constituting speech, said speech detector receiving on an input at regular intervals $\tau$ digital samples including a sign bit of the signal to be analysed, and comprising:
   a squaring circuit which is connected to said speech detector input;
   a first digital accumulator which is connected to the output of said squaring circuit and which is reset to zero every L signal samples (where L is a positive integer);
   a circuit for detecting variations in the value of the sign bit of signal samples applied to said speech detector input;
   a second digital accumulator which is connected to the output of said sign bit value variation detector circuit and which is reset to zero every L signal samples;

a bank of first threshold comparators with staggered threshold values and having respective inputs connected to the output of said first digital accumulator and respective outputs carrying respective binary signals indicating whether the output of said first digital accumulator is above or below their respective thresholds;

a bank of second threshold comparators with staggered threshold values defining contiguous ranges of which one encompasses the value $1.25 \times L \times \tau$ where $\tau$ is expressed in milliseconds, said second threshold comparators having respective inputs connected to the output of said second digital accumulator and respective outputs carrying respective binary signals representative of the range currently encompassing the output signal of said second digital accumulator; and a selector circuit having inputs connected to the outputs of said first and second threshold comparators and being responsive to the output states of said second threshold comparators by selecting the output of one of said first threshold comparators so that the threshold value of the selected first threshold comparator decreases with increasing separation of the range encompassing the output signal of said second digital accumulator from the range encompassing the value $1.25 \times L \times \tau$, that output state of the selected first threshold comparator which corresponds to an output signal from said first digital accumulator exceeding its threshold value being indicative of the presence of speech and the complementary output state being indicative of the absence of speech.

7. A speech detector according to claim 6, further comprising:

a time-delay generator connected to the output of said selector circuit and enabled for a period equal to said holding interval in response to the output signal of said selector circuit going to the condition indicative of the absence of speech after remaining for a period at least equal to said previous activity interval in the condition indicative of the presence of speech; and a holding circuit controlled by said time-delay generator which is connected to the output of said selector circuit and the output signal of which constitutes the speech detector output signal, the state of which signifies the presence of speech or is equivalent to the output state of said selector circuit, according to whether said time-delay generator is enabled or not.

8. A speech detector according to claim 6, further comprising:

a bank of two third threshold comparators, one of which has a theshold value much higher than those of said first threshold comparators and the other of which has a theshold value between the lowest first threshold comparator threshold value and the next higher first threshold comparator threshold value;

a bistable circuit which is connected to the outputs of said third threshold comparators and which is switched to a state indicative of a predetermined loud speech level under the control of said third threshold comparator with the higher threshold value and to a complementary state indicative of a predetermined quiet speech level under the control of the other of said third threshold comparators; and a disabling circuit in said selector circuit responsive to said bistable circuit state indicative of said loud speech level by preventing selection of the first threshold comparator with the lowest threshold value.

9. A speech detector according to claim 7, in which said time-delay generator provides two values of said previous activity interval and two values of said holding interval, selection between said values being controlled by said bistable circuit.

* * * * *